(12) United States Patent
Akiyama et al.

(10) Patent No.: US 9,733,497 B2
(45) Date of Patent: Aug. 15, 2017

(54) SEMICONDUCTOR OPTICAL MODULATOR AND OPTICAL MODULE

(71) Applicant: Mitsubishi Electric Corporation, Chiyoda-ku (JP)

(72) Inventors: Koichi Akiyama, Tokyo (JP); Eiji Yagyu, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/084,755

(22) Filed: Mar. 30, 2016

(65) Prior Publication Data

US 2016/0299362 A1    Oct. 13, 2016

(30) Foreign Application Priority Data

Apr. 9, 2015   (JP) .................................. 2015-079744
Jan. 28, 2016  (JP) .................................. 2016-013968

(51) Int. Cl.
| G02F 1/035 | (2006.01) |
| G02F 1/015 | (2006.01) |
| G02F 1/017 | (2006.01) |
| G02F 1/025 | (2006.01) |
| G02F 1/225 | (2006.01) |

(52) U.S. Cl.
CPC .......... *G02F 1/015* (2013.01); *G02F 1/01708* (2013.01); *G02F 1/01725* (2013.01); *G02F 1/025* (2013.01); *G02F 1/225* (2013.01); *G02F 2001/0157* (2013.01); *G02F 2001/01733* (2013.01); *G02F 2001/01741* (2013.01); *G02F 2201/126* (2013.01)

(58) Field of Classification Search
CPC .. G02F 1/017; G02F 1/01708; G02F 1/01725; G02F 1/025; G02F 2001/01733; G02F 2001/01741; G02F 2001/0155–2001/0157
USPC ........................................................ 385/1–3
See application file for complete search history.

(56) References Cited

U.S. PATENT DOCUMENTS 5,008,717 A *  4/1991  Bar-Joseph ............ B82Y 20/00
                                                359/245
5,402,259 A *  3/1995  Lembo ................... B82Y 20/00
                                                359/245

(Continued)

FOREIGN PATENT DOCUMENTS

| JP | 3-242617 | 10/1991 |
| JP | 8-62554  | 3/1996  |

OTHER PUBLICATIONS

C. Rolland et al. "10 Gbit/s, 1-56 μm Multiquantum Well InP/ InGaAsP Mach-Zehnder Optical Modulator", Electronics Letters, vol. 29, No. 5, Mar. 4, 1993, 2 pages.

*Primary Examiner* — Robert Tavlykaev
(74) *Attorney, Agent, or Firm* — Oblon, McClelland, Maier & Neustadt, L.L.P.

(57) ABSTRACT

Provided is a technique for enabling an α parameter to be approximated to zero. A multiple quantum well structure includes a layer structure including a first barrier layer, an intermediate layer, a well layer, and a second barrier layer. The conduction band energies of the first and second barrier layers, the intermediate layer, and the well layer are larger in this order, and the valence band energies of the intermediate layer, the well layer, and the first and second barrier layers are larger in this order.

5 Claims, 8 Drawing Sheets

(56) References Cited

U.S. PATENT DOCUMENTS

| | | | | |
|---|---|---|---|---|
| 5,481,397 A * | 1/1996 | Burt | ............... | B82Y 20/00 257/14 |
| 6,275,321 B1 * | 8/2001 | Greene | ............... | B82Y 20/00 257/18 |
| 6,978,055 B2 * | 12/2005 | Miyazaki | ............... | B82Y 20/00 359/245 |
| 6,985,273 B2 * | 1/2006 | Kang | ............... | B82Y 20/00 359/240 |
| 7,136,544 B1 * | 11/2006 | Gunn, III | ............... | G02B 6/12004 385/129 |
| 2004/0067020 A1 * | 4/2004 | Betty | ............... | B82Y 20/00 385/39 |
| 2007/0051939 A1 * | 3/2007 | Nakahara | ............... | B82Y 20/00 257/14 |
| 2008/0013150 A1 * | 1/2008 | Li | ............... | H04B 10/2575 359/238 |
| 2008/0101425 A1 * | 5/2008 | Murata | ............... | B82Y 20/00 372/26 |

* cited by examiner

F I G. 3
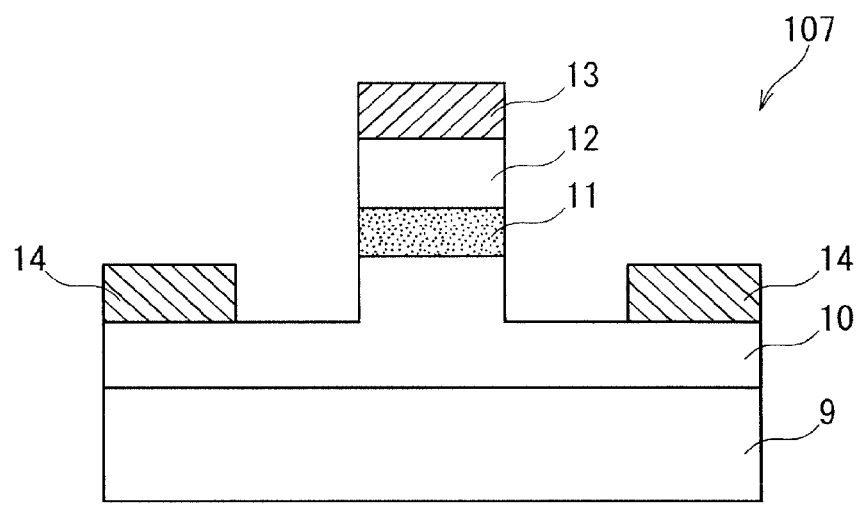
F I G. 4
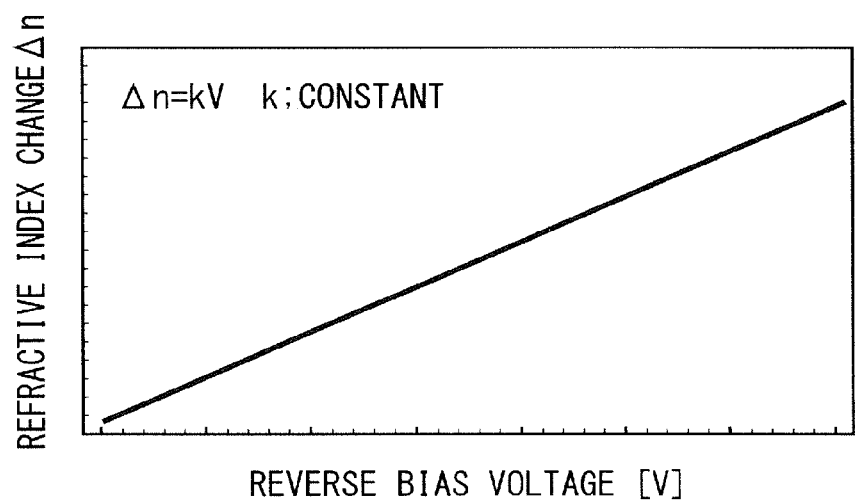

SEMICONDUCTOR OPTICAL MODULATOR AND OPTICAL MODULE

BACKGROUND OF THE INVENTION

Field of the Invention

The present invention relates to a semiconductor optical modulator and an optical module, such as a semiconductor Mach-Zehnder modulator frequently used in, for example, trunk-line long distance optical communication.

Description of the Background Art

Optical modulators used in optical communication systems are roughly divided into electro-absorption (EA) modulators for modulating the intensity of light and Mach-Zehnder (MZ) modulators for modulating the phase of light. Since the MZ modulators can reduce the wavelength chirps (wavelength variations) more than by the EA modulators, the MZ modulators can be particularly used for long-distance transmission.

The MZ modulators are divided into MZ modulators (LN-MZ modulators) containing $LiNbO_3$ (LN) using the refractive index change induced by the Pockels effect, and MZ modulators (semiconductor MZ modulators) having a semiconductor multiple quantum well structure in which the refractive index change increases by the quantum-confined Stark effect, among semiconductor materials using the refractive index change caused by the optical absorption change.

The LN-MZ modulators have less modulation loss because the optical absorption when the modulators are driven is negligible. However, they have relatively larger 2 $V\pi$ ($V\pi$ represents a half-wave voltage), that is, approximately 6 V at a maximum. In contrast, the semiconductor MZ modulators have relatively smaller 2 $V\pi$, that is, approximately 3 V at a maximum, but have larger modulation loss in transmission than the LN-MZ modulators because the optical absorption occurs when the modulators are operated. The smaller the modulation loss of the optical modulators is, the more advantageous the transmission is. Furthermore, the smaller the half-wave voltage $V\pi$ is, the more the power consumption can be reduced. Thus, the optical modulators require smaller modulation loss and a smaller half-wave voltage $V\pi$. The semiconductor multiple quantum well structure is disclosed by, for example, C. Rolland et al., "10 Gbit/s, 1.56 μm MULTI QUANTUM WELL InP/InGaAsP MACH-ZEHNDER OPTICAL MODULATOR", ELECTRONICS LETTERS, March 1993, vol. 29, no. 5, pp. 471-472 (FIG. 1) (hereinafter referred to as Non Patent Document 1).

Among the MZ modulators that can reduce the wavelength chirps (wavelength variations) more than by the EA modulators, the LN-MZ modulators and the semiconductor MZ modulators have different dependence of the wavelength chirps (wavelength variations) on voltage.

Since the refractive index change is induced by the Pockels effect in the LN-MZ modulators, generally, the refractive index linearly changes with respect to the reverse bias voltage. In contrast, since the refractive index change is induced by the quantum-confined Stark effect in the semiconductor MZ modulators, the refractive index changes not linearly but non-linearly with respect to the reverse bias voltage.

In the semiconductor MZ modulators, an $\alpha$ parameter that is an indicator of the chirp (wavelength variation) characteristics is not zero because of the non-linearity of the refractive index with respect to the reverse bias voltage. Thus, there is a problem in that the chirp characteristics of the semiconductor MZ modulators are more disadvantageous than those of the LN-MZ modulators.

SUMMARY OF THE INVENTION

The present invention has been conceived in view of the problem, and the object is to provide a technique for approximating the $\alpha$ parameter to zero.

A semiconductor optical modulator according to the present invention includes: a semiconductor substrate; and a semiconductor multilayer structure formed on the semiconductor substrate and included in an optical waveguide in which a phase of light shifts with application of a voltage. The semiconductor multilayer structure includes: a p-type clad layer and an n-type clad layer; and a multiple quantum well structure sandwiched between the p-type clad layer and the n-type clad layer. The multiple quantum well structure includes a layer structure including: a first barrier layer having a first bandgap; an intermediate layer connected to a portion of the first barrier layer and having a second bandgap smaller than the first bandgap, the portion being closer to the n-type clad layer; a well layer connected to a portion of the intermediate layer and having a third bandgap smaller than the second bandgap, the portion being closer to the n-type clad layer; and a second barrier layer connected to a portion of the well layer and having the first bandgap, the portion being closer to the n-type clad layer. A conduction band energy of the first and second barrier layers is larger than a conduction band energy of the intermediate layer, and the conduction band energy of the intermediate layer is larger than a conduction band energy of the well layer. A valence band energy of the intermediate layer is larger than a valence band energy of the well layer, and the valence band energy of the well layer is larger than a valence band energy of the first and second barrier layers. Accordingly, the $\alpha$ parameter can be approximated to zero.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a cross-sectional view of a structure of the related MZ modulator.

FIG. 4 illustrates a relationship between the refractive index and the reverse bias voltage in LN-MZ modulators.

DESCRIPTION OF THE PREFERRED EMBODIMENTS

[Related MZ Modulator]

Before describing a semiconductor optical modulator according to Preferred Embodiment 1 of the present invention, an MZ modulator related to the semiconductor optical modulator (hereinafter referred to as "related MZ modulator") will be described.

Figure 1:
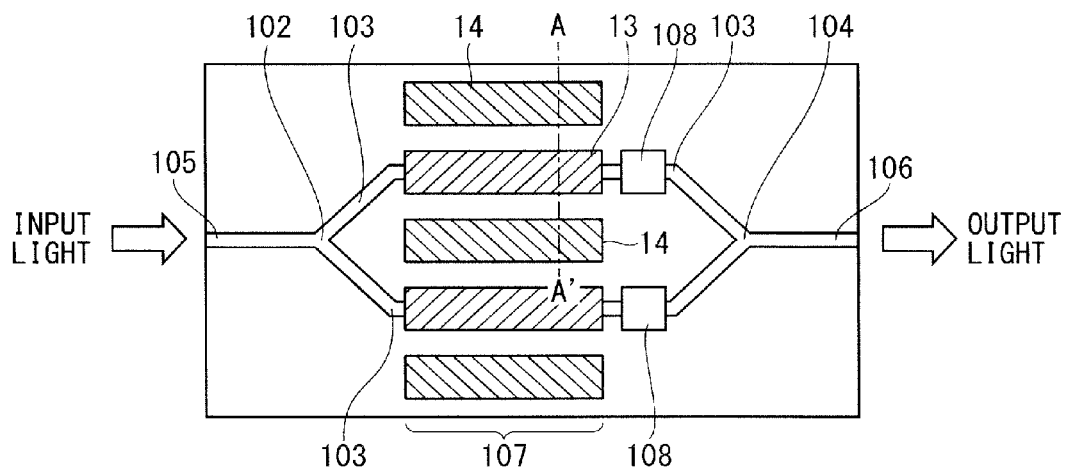
FIG. 1 is a plan view schematically illustrating a related MZ modulator.

FIG. 1 is a plan view schematically illustrating the related MZ modulator. The related MZ modulator includes a branching portion 102, branch waveguides 103, a multiplexing portion 104, an incident-light waveguide 105, an exit-light waveguide 106, phase modulating portions 107 each including a signal electrode 13 and electrodes 14, and phase adjusters 108.

The light incident on the incident-light waveguide 105 is branched into two in the branching portion 102, and passes through the branch waveguides 103 disposed upward and downward. The length of the branch waveguides 103 is, for example, 3 mm. Upon application of a reverse bias voltage on each of the phase modulating portions 107 on the upper and lower branch waveguides 103, the phase of the light passing through each of the phase modulating portions 107 shifts. The branched light in which the phase has shifted passes through the phase adjusters 108, and then is multiplexed by the multiplexing portion 104. When the phases of the branched light to be multiplexed are coherent, the optical output of the light emitted from the exit-light waveguide 106 becomes the maximum.

Specifically, each of the two phase modulating portions 107 disposed on the two branch waveguides 103 performs a push-pull operation with application of a DC bias voltage (center bias voltage) and an RF voltage (push-pull voltage) that reverses in sign between the two phase modulating portions 107, between the signal electrode 13 and the electrodes 14. The electrodes 14 are disposed on each side of the signal electrode 13 on the branch waveguide 103, as, for example, ground electrodes superior in noise tolerance.

Figure 2:
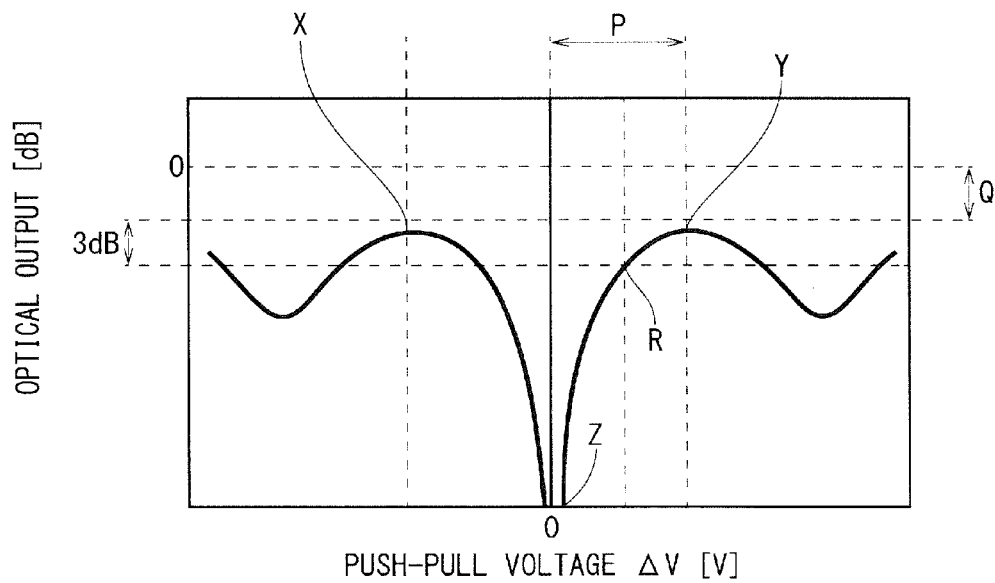
FIG. 2 illustrates dependence of optical output from the related MZ modulator on the push-pull voltage.

FIG. 2 illustrates dependence of optical output from the related MZ modulator on the push-pull voltage. In FIG. 2, the horizontal axis represents the push-pull voltage ΔV (V), and the vertical axis represents the optical output (dB).

When the push-pull voltage is 0 V, only the DC bias voltage is applied to each of the branch waveguides 103. Here, the phase of the light in one of the two phase adjusters 108 disposed on the two branch waveguides 103 in FIG. 1 shifts. Thus, the phases of the light to be multiplexed by the multiplexing portion 104 (the phases of the light output from the branch waveguides 103) are displaced by π with each other. As a result, the optical output of the light emitted from the exit-light waveguide 106 becomes the minimum, and equates to the output at a point Z in FIG. 2.

In contrast, when the push-pull voltage is applied, the phases of the light to be multiplexed by the multiplexing portion 104 are displaced by other than π with each other. Among such cases, when the phases of the light to be multiplexed by the multiplexing portion 104 are coherent, the optical output of the light emitted from the exit-light waveguide 106 becomes the maximum, and equates to the output at points X and Y in FIG. 2.

In FIG. 2, a width P represents the variation in push-pull voltage from the point Z to the point Y, a width Q represents an amount of difference between the optical output of 0 dB and the optical output at the point X or Y, and a point R represents a point at which the optical output at the point Y is reduced by 3 dB.

At the points X and Y where the optical output is the maximum, the phases of the light to be multiplexed by the multiplexing portion 104 are coherent. In other words, the phases of the light to be incident on the phase adjusters 108 are displaced by π with each other. In contrast, at the point Z where the optical output is the minimum, the phases of the light to be incident on the phase adjusters 108 are coherent. As described above, phase modulation is modulation using a phase difference in light, and the phase difference is adjusted by the phase modulating portions 107 herein. Half of the RF voltage (push-pull voltage) required to shift the phase of the exit light by π is referred to as a half-wave voltage Vπ. Furthermore, the displacement with respect to 0 dB when the optical output is the maximum is referred to as modulation loss.

Examples of the related MZ modulator include MZ modulators (LN-MZ modulators) containing $LiNbO_3$ (LN) using the refractive index change induced by the Pockels effect, and MZ modulators (semiconductor MZ modulators) having a semiconductor multiple quantum well structure using the refractive index change induced by the quantum-confined Stark effect.

The LN-MZ modulators have less modulation loss because the optical absorption when the modulators are driven is negligible. However, they have relatively larger 2 Vπ (Vπ represents a half-wave voltage), that is, approximately 6 V at a maximum. In contrast, the semiconductor MZ modulators have relatively smaller 2 Vπ, that is, approximately 3 V at a maximum, but have larger modulation loss in transmission than the LN-MZ modulators because the optical absorption occurs when the modulators are operated. The smaller the modulation loss of the optical modulators is, the more advantageous the transmission is. Furthermore, the smaller the half-wave voltage Vπ is, the more the power consumption can be reduced. Thus, the optical modulators require smaller modulation loss and a smaller half-wave voltage Vπ.

FIG. 3 is a cross-sectional view of a waveguide (phase modulating portion 107) of the related MZ modulator that is taken along A-A' in FIG. 1. Specifically, FIG. 3 is a cross-sectional view of a semiconductor MZ modulator. The phase modulating portion 107 formed on a semi-insulating InP substrate 9 equivalent to a semiconductor substrate includes: a p-doped p-type clad layer 12; a n-doped n-type clad layer 10; a multiple quantum well structure 11 which is an insulating active layer and in which well layers and barrier layers are alternately laminated; the signal electrode 13; and the electrodes 14. The multiple quantum well structure 11 is sandwiched between the p-type clad layer 12 and the n-type clad layer 10, and the phase modulating portion 107 has a PIN structure (this structure is described in, for example, Non Patent Document 1). In the example of FIG. 3, the signal electrode 13 is disposed on the p-type clad layer 12, and the electrodes 14 are disposed on the n-type clad layer 10 and located on each side of the multiple quantum well structure 11 and others.

In the related MZ modulator, the α parameter that is an indicator of the chirp (wavelength variation) characteristics that affect the transmission characteristics can be expressed by the following Equation (1). In Equation (1), ΔV represents a push-pull voltage, I represents the intensity of output light (multiplexed light obtained by multiplexing), and φ represents a phase of the output light. Furthermore, when the upper branch waveguide 103 in FIG. 1 is an arm 1 and the lower branch waveguide 103 in FIG. 1 is an arm 2, $V_1$ and $V_2$ represent the reverse bias voltages to be applied to the arm 1 and the arm 2, respectively.

$$\alpha = 2I(V_1, V_2) \left\{ \frac{\frac{d\phi(V_1, V_2)}{d(\Delta V)}}{\frac{dI(V_1, V_2)}{d(\Delta V)}} \right\} \quad \text{[Equation (1)]}$$

The electric field amplitude $E_o$ of the output light (multiplexed light) can be expressed by the following Equation (2). In Equation (2), $E_i$ represents an electric field amplitude of input light, A and B represent electric field amplitudes of the light that passes through the arm 1 and the arm 2, respectively, after the light is absorbed, $\phi_1$ and $\phi_2$ represent respective phases of the arms 1 and 2, and γ represents a branching ratio of light that is branched into the arms 1 and 2.

$$E_0(V_1, V_2) = \sqrt{I(V_1, V_2)} \quad \text{[Equation (2)]}$$

$$= \frac{E_i}{2}\{A(V_1)e^{j\phi_1(V_1)} + \gamma B(V_2)e^{j\phi_2(V_2)}\}$$

Here, the electric field amplitudes A and B and the phases $\phi_1$ and $\phi_2$ can be expressed by the following Equations (3). In Equations (3), $\Delta n_1$ and $\Delta n_2$ represent respective refractive indexes of the arms 1 and 2, $a_{abs1}$ and $a_{abs2}$ represent absorption by the arms 1 and 2, respectively, λ represents a wavelength of light incident on the optical modulator, L represents a length of the phase modulating portion 107 on the waveguide, and Γ represents an overlap integral of a modulation layer and an optical cross section in the phase modulating portion 107.

$$A(V_1) = \exp\left\{-\frac{a_{abs}(V_1)}{2}\Gamma L\right\} \quad \text{[Equations (3)]}$$

$$B(V_1) = \exp\left\{-\frac{a_{abs}(V_2)}{2}\Gamma L\right\}$$

$$\phi_1(V_1) = \frac{2\pi l}{\lambda}\Delta n(V_1)\Gamma L$$

$$\phi_2(V_2) = \frac{2\pi l}{\lambda}\Delta n(V_2)\Gamma L + \pi l$$

The intensity I and the phase φ of the output light can be expressed by the following Equations (4) and (5), respectively, based on a ratio between the imaginary number and the real number in Equation (2).

$$I(V_1, V_2) = \quad \text{[Equation (4)]}$$
$$\frac{E_i^2}{4}\{A^2(V_1) + \gamma^2 B^2(V_2) + 2\gamma AB\cos(\phi_1(V_1) - \phi_2(V_2))\}$$

$$\phi(V_1, V_2) = \tan^{-1}\left\{\frac{A(V_1)\sin\phi_1(V_1) + \gamma B(V_2)\sin\phi_2(V_2)}{A(V_1)\cos\phi_1(V_1) + \gamma B(V_2)\cos\phi_2(V_2)}\right\} \quad \text{[Equation (5)]}$$

Furthermore, the center bias voltage Vc, the reverse bias voltages $V_1$ and $V_2$ and the push-pull voltage ΔV hold the following relationship expressed by Equation (6).

$$V_1 = V_c + \Delta V, V_2 = V_c - \Delta V \quad \text{[Equation (6)]}$$

Since the refractive index change is induced by the Pockels effect in the LN-MZ modulators, generally, the refractive index linearly changes with respect to the reverse bias voltage as illustrated in FIG. 4. In FIG. 4, the horizontal axis represents the reverse bias voltage (V), and the vertical axis represents the refractive index change Δn.

The absorption of the LN-MZ modulators is negligibly less than that of the semiconductor MZ modulators. Thus, A and B in Equation (2) can be regarded as zero. Accordingly, if a favorable waveguide in which the branching ratio γ of the arms 1 and 2 is 1 is achieved, dependence of the refractive index of the LN-MZ modulators on the reverse bias voltage is expressed by, for example, the following Equation (7), for example, using a constant k.

$$\Delta n = kV \quad \text{[Equation (7)]}$$

Here, substitution of Equations (6) and (7) into Equation (5) yields the following Equation (8).

$$\phi(\Delta V) = \tan^{-1}\left\{\frac{\cos\left(\frac{2\pi k V_c}{\lambda}\Gamma L\right)}{\sin\left(\frac{2\pi k V_c}{\lambda}\Gamma L\right)}\right\} \quad \text{[Equation (8)]}$$

Equation (8) has only the term on the center bias voltage Vc, and does not have the term on the push-pull voltage ΔV because it is canceled by the arms 1 and 2. Thus, differentiating the phase φ in Equation (8) with respect to ΔV yields zero, thus showing that the α parameter expressed by Equation (1) is zero.

Figure 5:
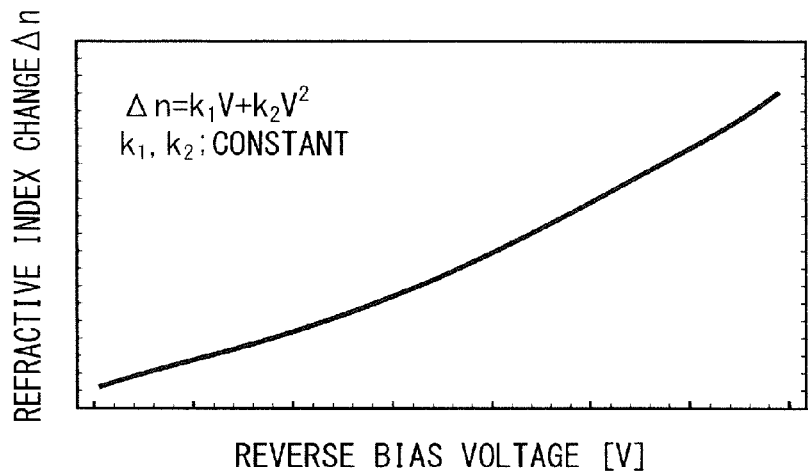
FIG. 5 illustrates a relationship between the refractive index and the reverse bias voltage in semiconductor MZ modulators.

In contrast, since the refractive index change is induced by the quantum-confined Stark effect in the semiconductor MZ modulators, the refractive index changes not linearly but non-linearly with respect to the reverse bias voltage as illustrated in FIG. 5. In FIG. 5, the horizontal axis represents the reverse bias voltage (V), and the vertical axis represents the refractive index change Δn.

Furthermore, since the absorption cannot be disregarded in the semiconductor MZ modulators, A and B in Equation (2) cannot be regarded as zero. Thus, unlike Equation (8) for the LN-MZ modulators, the term on the push-pull voltage ΔV remains in Equation (5). Thus, differentiating the phase φ in Equation (5) with respect to ΔV does not yield zero, thus showing that the α parameter expressed by Equation (1) is not zero.

This shows that when the push-pull voltage changes from the point Z to the point X or Y, the phase of the multiplexed light shifts. Such the phase shift probably causes distortion in the trajectory and degradation in the modulation signal, in a constellation diagram representing a relationship between phases and amplitudes. The constellation diagram is often used in, for example, quadrature phase shift keying (QPSK) and 16 quadrature amplitude modulation (16-QAM).

As described above, there is a problem in that the chirp characteristics of the semiconductor MZ modulators are more disadvantageous than those of the LN-MZ modulators because the α parameter is not zero due to the non-linearity of the refractive index with respect to the reverse bias voltage. In contrast, a semiconductor optical modulator according to Preferred Embodiment 1 to be described hereinafter can solve such a problem.

Preferred Embodiment 1

Figure 6:
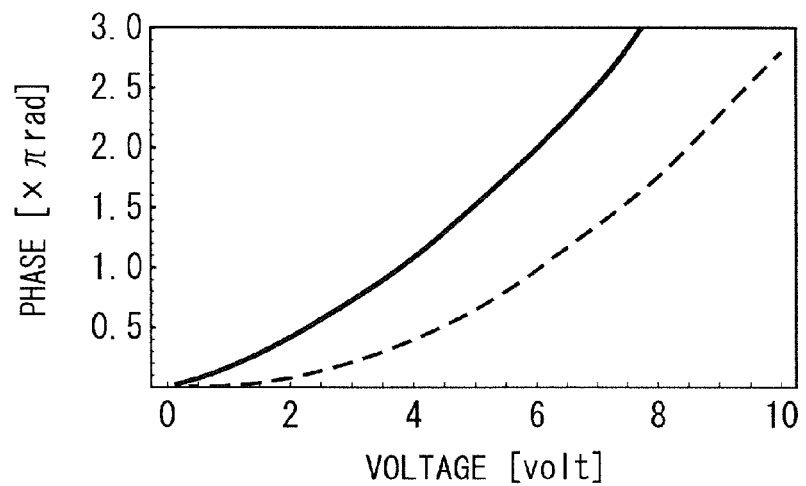
FIG. 6 illustrates a relationship between the phase and the reverse bias voltage in semiconductor MZ modulators.

In the LN-MZ modulators and the semiconductor MZ modulators, not a voltage but an electric field directly determines the magnitude of a refractive index change. The dotted line in FIG. 6 represents an example of a typical relationship between the reverse bias voltage and a phase of light, in a structure using AlGaInAs that is a quaternary alloy semiconductor as a quantum well structure. In FIG. 6, the horizontal axis represents the reverse bias voltage (V), and the vertical axis represents the phase. The phase in the vertical axis corresponds to the refractive index change Δn.

As illustrated in FIG. 6, the relationship between the reverse bias voltage and the phase (birefringence variation) is not linear but represented almost by a quadratic curve. Assuming that the electric field is increased even with the same voltage, the solid line in FIG. 6 has been shifted from the dotted line toward the lower voltages. This shifting produces the two possible advantages.

The two advantages will be described hereinafter using equations. Assuming that the refractive index depends on up to the squared term of the voltage, when, for example, the primary coefficient and the secondary coefficient are represented by $k_1$ and $k_2$, respectively (both of them are positive values), the dotted line in FIG. 6 can be expressed by the following Equation (9).

$$\Delta n = k_1 V + k_2 V^2 \qquad \text{[Equation (9)]}$$

The solid line that has been shifted from the dotted line toward the lower voltages by $V_o$ in FIG. 6 can be expressed by the following Equation (10).

$$\begin{aligned}\Delta n' &= k_1(V+V_0) + k_2(V+V_0)^2 \qquad \text{[Equation (10)]}\\ &= (k_1 + 2k_2 V_0)V + K_2 V^2 + k_1 V_0 + k_2^2 V_0\end{aligned}$$

The primary coefficient of V is represented by $k_1$ in Equation (9), whereas the primary coefficient of V is represented by $(k_1 + 2k_2 V_0)$ larger than $k_1$ in Equation (10). Thus, the push-pull voltage ΔV for obtaining a target phase shift with respect to the same center bias voltage $V_c$ can be reduced, as the first advantage of the shifting.

Furthermore, a ratio of the primary coefficient to the secondary coefficient in Equation (10) is larger than that in Equation (9). Thus, the linearity can be increased as the second advantage of the shifting.

Figure 7:
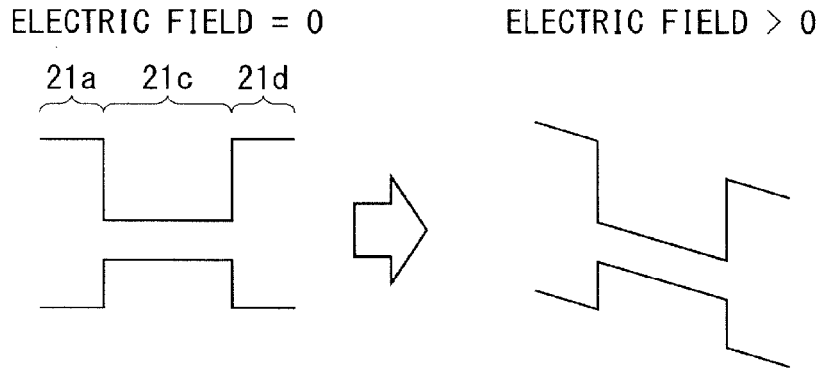
FIG. 7 illustrates band diagrams of a simple quantum well structure.

Thus, the structure according to Preferred Embodiment 1 to be described hereinafter can increase the electric field even with the same voltage. In other words, the structure can substantially shift the relationship between the reverse bias voltage and the phase (birefringence variation) as expressed by Equation (10). Before describing the structure, a conventional structure will be described. FIG. 7 illustrates band diagrams of a quantum well structure used in a conventional optical modulator containing AlGaInAs (hereinafter may be referred to as "simple quantum well structure").

In the structure in FIG. 7, a layer with a smaller energy bandgap called a well layer 21c containing AlGaInAs is sandwiched between layers with larger energy bandgaps called first and second barrier layers 21a and 21d containing AlGaInAs. The difference in energy bandgap between the first and second barrier layers 21a and 21d and the well layer 21c can be achieved by changing composition ratios of AlGaInAs. With application of a voltage to a structure having the band diagram as illustrated in FIG. 7, the energy bandgap is tilted. The magnitude of this tilt equates to an electric field intensity.

Next, a structure of a semiconductor optical modulator according to Preferred Embodiment 1 will be described. For example, a semiconductor MZ modulator is used as this semiconductor optical modulator.

The phase modulating portion 107 of the semiconductor optical modulator according to Preferred Embodiment 1 includes the p-type clad layer 12, the n-type clad layer 10, and the multiple quantum well structure 11, similarly as the phase modulating portion 107 of the related MZ modulator in FIG. 3. The semiconductor optical modulator according to Preferred Embodiment 1 differs from the related MZ modulator in composition of the multiple quantum well structure 11.

Figure 8:
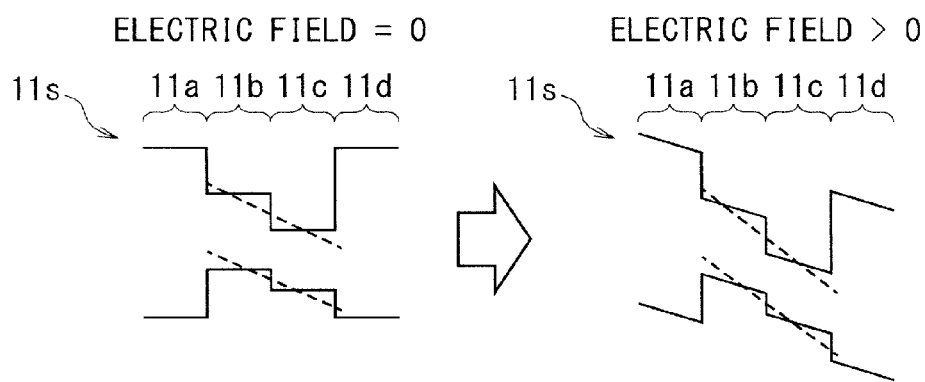
FIG. 8 illustrates band diagrams of a multiple quantum well structure according to Preferred Embodiment 1.

FIG. 8 illustrates band diagrams of the multiple quantum well structure 11 according to Preferred Embodiment 1.

The multiple quantum well structure 11 includes a layer structure 11s including a first barrier layer 11a, an intermediate layer 11b, a well layer 11c, and a second barrier layer 11d.

The first barrier layer 11a is disposed closer to the p-type clad layer 12, and has a first bandgap. The first barrier layer 11a contains, for example, AlGaInAs.

The intermediate layer 11b is connected to a part of the first barrier layer 11a that is closer to the n-type clad layer 10, and has a second bandgap smaller than the first bandgap. The intermediate layer 11b contains, for example, AlGaInAs that differs in composition ratio from the first barrier layer 11a.

The well layer 11c is connected to a part of the intermediate layer 11b that is closer to the n-type clad layer 10, and has a third bandgap smaller than the second bandgap. The well layer 11c contains, for example, InGaAsP.

The second barrier layer 11d is connected to a part of the well layer 11c that is closer to the n-type clad layer 10, and has the first bandgap as same as that of the first barrier layer 11a. The second barrier layer 11d contains the same material as that of the first barrier layer 11a.

When the conduction band energy of the first and second barrier layers 11a and 11d is represented by Ecb, the conduction band energy of the intermediate layer 11b is represented by Eci, and the conduction band energy of the well layer 11c is represented by Ecw, a relationship Ecb>Eci>Ecw holds. In other words, the conduction band energy Ecb of the first and second barrier layers 11a and 11d is larger than the conduction band energy Eci of the intermediate layer 11b, and the conduction band energy Eci of the intermediate layer 11b is larger than the conduction band energy Ecw of the well layer 11c.

Furthermore, when the valence band energy of the first and second barrier layers 11a and 11d is represented by Evb, the valence band energy of the intermediate layer 11b is represented by Evi, and the valence band energy of the well layer 11c is represented by Evw, a relationship Evi>Evw>Evb holds. In other words, the valence band energy Evi of the intermediate layer 11b is larger than the valence band energy Evw of the well layer 11c, and the valence band energy Evw of the well layer 11c is larger than the valence band energy Evb of the first and second barrier layers 11a and 11d.

Conclusion of Preferred Embodiment 1

The semiconductor optical modulator according to Preferred Embodiment 1 includes a semiconductor substrate, and a semiconductor multilayer structure formed on the semiconductor substrate and included in an optical waveguide in which the phase of light shifts with application of a voltage. The semiconductor multilayer structure includes the p-type clad layer 12, the n-type clad layer 10, and the multiple quantum well structure 11 sandwiched between the p-type clad layer 12 and the n-type clad layer 10. The multiple quantum well structure 11 includes the layer structure 11s including: the first barrier layer 11a having the first bandgap; the intermediate layer 11b connected to a part of the first barrier layer 11a that is closer to the n-type clad layer 10, and having the second bandgap smaller than the first bandgap; the well layer 11c connected to a part of the intermediate layer 11b that is closer to the n-type clad layer 10, and having the third bandgap smaller than the second bandgap; and the second barrier layer 11d connected to a part of the well layer 11c that is closer to the n-type clad layer 10, and having the first bandgap. The conduction band energy of the first and second barrier layers 11a and 11d is larger than the conduction band energy of the intermediate layer 11b, and the conduction band energy of the intermediate layer 11b is larger than the conduction band energy of the well layer 11c. The valence band energy of the intermediate layer 11b is larger than the valence band energy of the well layer 11c, and the valence band energy of the well layer 11c is larger than the valence band energy of the first and second barrier layers 11a and 11d.

With such a structure, the intermediate layer 11b is disposed closer to the p-type clad layer 12 with respect to the well layer 11c (disposed to have a higher potential with application of a reverse bias), and the conduction band energy and the valence band energy of the intermediate layer 11b are larger than those of the well layer 11c. Accordingly, energy levels and wave functions of the electrons and the electron holes confined in the intermediate layer 11b and the well layer lie which are sandwiched between the first and second barrier layers 11a and 11d and to which an electric field is not even applied are the same as those in a simple quantum well structure to which an electric field is substantially applied, as illustrated in the dotted line of FIG. 8. As a result, since the relationship between the reverse bias voltage and the phase (birefringence variation) can be substantially shifted as expressed by Equation (10) without application of a voltage, the linearity can be increased and the α parameter can be approximated to zero as one of the two advantages. Furthermore, reduction in the push-pull voltage ΔV can be expected as the other of the two advantages.

Figure 9:
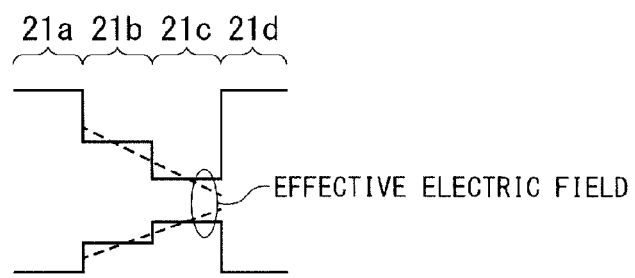
FIGS. 9 and 10 each illustrate a band diagram related to Preferred Embodiment 1.
Figure 10:
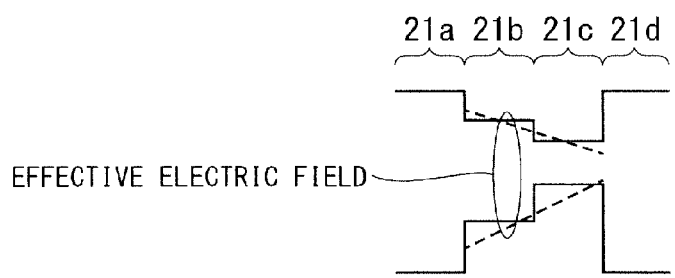

In the structure of FIG. 8, the difficulty lies in fabricating the first and second barrier layers 11a and 11d, the intermediate layer 11b, and the well layer 11c using an identical quaternary alloy. For example, although AlGaInAs (differing in composition ratio) is used in each of first and second barrier layers 21a and 21d, an intermediate layer 21b, and a well layer 21c in a structure of FIG. 9, the structure of FIG. 9 cannot be implemented as the structure illustrated in FIG. 8 because the orientation of an effective electric field of a conduction band is opposite to that of a valence band. For example, although InGaAsP (differing in composition ratio) is used in each of the first and second barrier layers 21a and 21d, the intermediate layer 21b, and the well layer 21c in the structure of FIG. 10, similarly, the structure of FIG. 10 cannot be implemented as the structure illustrated in FIG. 8.

In contrast, the structure according to Preferred Embodiment 1 using the intermediate layer 11b containing AlGaInAs and the well layer 11c containing InGaAsP can be implemented as the structure illustrated in FIG. 8.

It is known that electrons in a conduction band have a smaller amount of shifted energy with application of a voltage because the effective mass of the electrons in the conduction band is smaller than that of electron holes in a valence band. Here, in order to effectively shift the relationship between the reverse bias voltage and the phase, it is necessary to increase an electric field to be applied to the conduction band more than that to be applied to the valence band. According to Preferred Embodiment 1, a conduction band energy difference ΔEc between AlGaInAs of the intermediate layer 11b and InGaAsP of the well layer 11c can be increased more than a valence band energy difference ΔEv therebetween. Thus, an effective electric field to be applied to the conduction band can be increased more than that to be applied to the valence band.

Preferred Embodiment 2

Hereinafter, constituent elements of a semiconductor optical modulator according to Preferred Embodiment 2 that are identical or similar to those according to Preferred Embodiment 1 will be denoted by the same reference numerals, and the different constituent elements will be mainly described.

The cross-sectional structure of the phase modulating portion 107 of the semiconductor optical modulator according to Preferred Embodiment 2 is almost the same as that according to Preferred Embodiment 1 (FIG. 3). The phase modulating portion 107 has a high-mesa structure in which an n-type clad layer 10 containing S- or Se-doped N—InP, a multiple quantum well structure 11 containing an active layer, a p-type clad layer 12 containing Be- or Zn-doped P—InP, and the signal electrode 13 are laminated in this order on the semi-insulating InP substrate 9.

Figure 11:
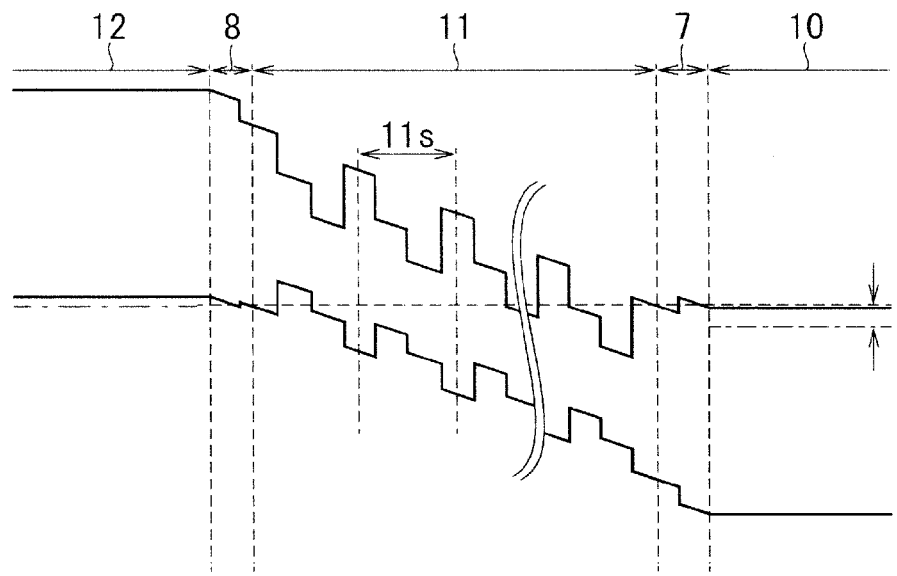
FIG. 11 illustrates a band diagram of a multiple quantum well structure according to Preferred Embodiment 2.

FIG. 11 illustrates a band diagram of the phase modulating portion 107 according to Preferred Embodiment 2. The semiconductor optical modulator according to Preferred Embodiment 2 includes an n-optical confinement layer 7 disposed between the n-type clad layer 10 and the multiple quantum well structure 11, and a p-optical confinement layer 8 disposed between the p-type clad layer 12 and the multiple quantum well structure 11.

Furthermore, as illustrated in FIG. 11, the multiple quantum well structure 11 sandwiched between the n-type clad layer 10 containing N—InP and the p-type clad layer 12 containing P—InP includes a plurality of layer structures 11s disposed in a connection direction of the first barrier layer 11a, the intermediate layer 11b, the well layer 11c, and the second barrier layer 11d in the layer structure 11s.

Figure 12:
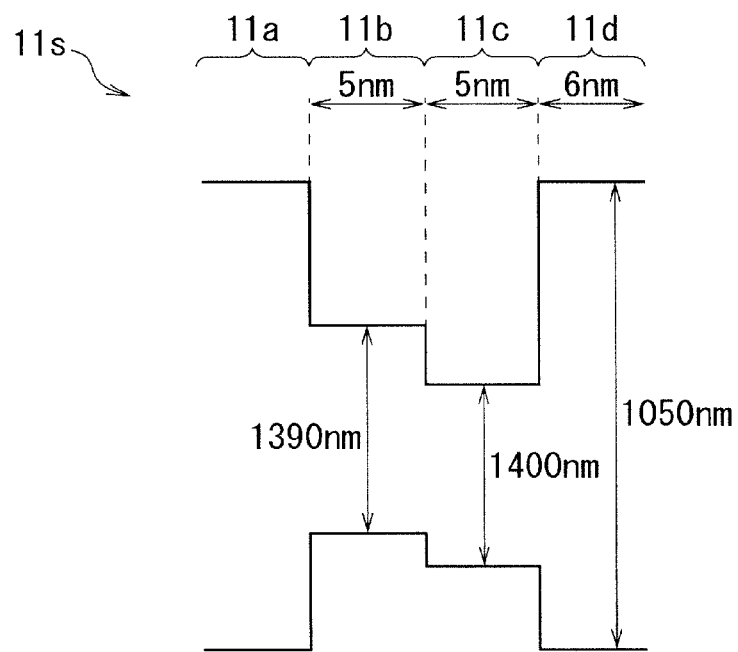
FIG. 12 illustrates a band diagram of a layer structure according to Preferred Embodiment 2.

FIG. 12 illustrates a band diagram of one of the layer structures 11s (the first barrier layer 11a, the intermediate layer 11b, the well layer 11c, and the second barrier layer 11d). The first and second barrier layers 11a and 11d are layers containing AlGaInAs and having a thickness of, for example, 6 nm. The intermediate layer 11b is a layer containing AlGaInAs and having a thickness of, for example, 5 nm. The well layer lie is a layer containing InGaAsP and having a thickness of, for example, 5 nm. Furthermore, in any adjacent two of the layer structures 11s, the second barrier layer 11d of one of the two layer structures 11s closer to the p-type clad layer 12 is used as the first barrier layer 11a of the other of the two layer structures 11s closer to the n-type clad layer 10 as illustrated in FIG. 11.

Here, the plurality of layer structures 11s are cyclically laminated in a direction of connecting the p-type clad layer 12 and the n-type clad layer 10. Furthermore, 13 of the well layers 11c and the intermediate layer 11c, and 12 of the first and second barrier layers 11a and 11d are laminated in the plurality of layer structures 11s. The number of the layers are not limited to such. In the multiple quantum well structure 11 illustrated in FIG. 11, the absorption edges of all the well layers 11c to which an electric field is not applied coincide with one another.

The barrier layer that is the closest to the p-type clad layer 12 among the plurality of the barrier layers is n-doped. This n-type doping concentration is preferably less than or equal to $10^{18}$ cm$^{-3}$. The n-doped barrier layer forms a p-n junction with the p-type clad layer 12.

Results of various measurements of the semiconductor optical modulator according to Preferred Embodiment 2 will be described hereinafter in comparison with the optical modulator including the simple quantum well structure containing AlGaInAs as illustrated in FIG. 7. The structure of a modulation layer used in comparison is obtained by replacing the multiple quantum well structure 11 in FIG. 11 with the simple quantum well structure, and the absorption edge of the quantum well structure which is used in comparison and to which an electric field is not applied coincides with the one in the structure in FIG. 12. Furthermore, the length of the modulating portion is 3 mm.

Figure 13:
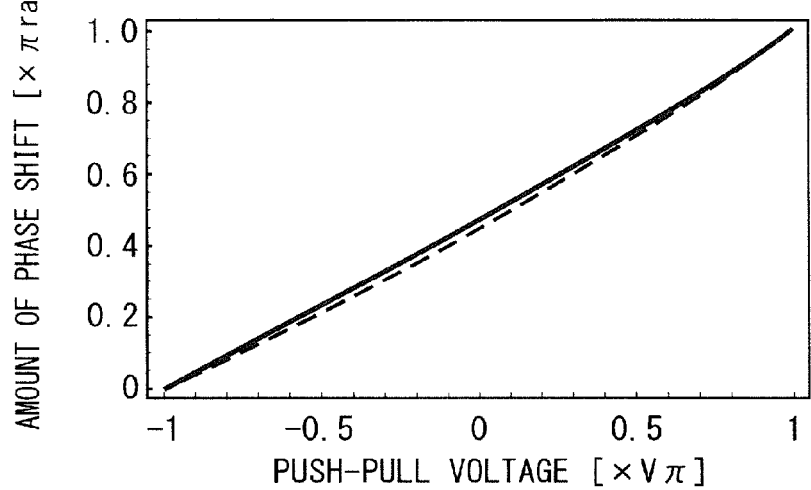
FIG. 13 illustrates a relationship between the phase and the push-pull voltage in a semiconductor optical modulator according to Preferred Embodiment 2.
Figure 14:
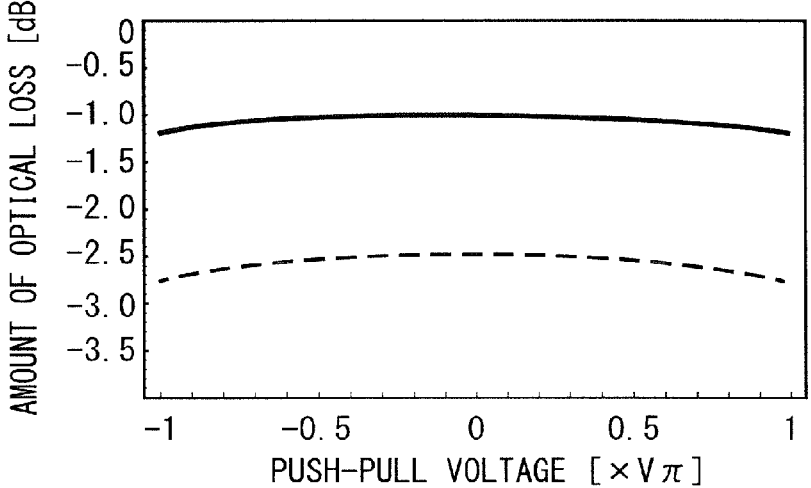
FIG. 14 illustrates a relationship between the amount of optical loss and the push-pull voltage in the semiconductor optical modulator according to Preferred Embodiment 2.
Figure 15:
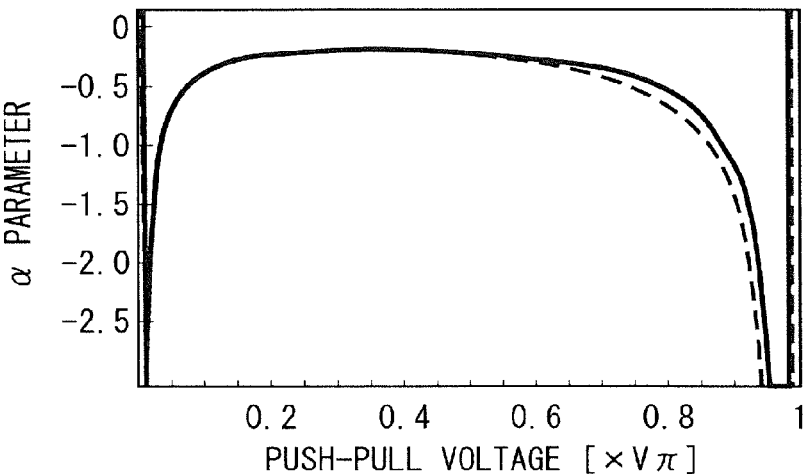
FIG. 15 illustrates a relationship between the α parameter and the push-pull voltage in the semiconductor optical modulator according to Preferred Embodiment 2.

FIGS. 13, 14, and 15 illustrate dependence of the phase shift, the modulation loss, and the α parameter, respectively, on the push-pull voltage. These are results of the measurements under the same wavelength (1.55 μm) and the same half-wave voltage Vπ (2Vπ=2.5 V).

FIG. 13 illustrates the result of normalizing the phase shift during the modulation from the point X to the point Y in FIG. 2. In FIG. 13, the horizontal axis represents the push-pull voltage ΔV (V), and the vertical axis represents the amount of phase shift Δφ (rad). Furthermore, the solid line represents the characteristics of the structure according to Preferred Embodiment 2, and the dotted line represents the characteristics of the simple quantum well structure.

FIG. 14 illustrates the amount of optical loss (corresponding to optical output) at the point X or Y in FIG. 2. In FIG. 14, the horizontal axis represents the push-pull voltage ΔV (V), and the vertical axis represents the amount of optical loss (dB) by absorption. Furthermore, the solid line represents the characteristics of the structure according to Preferred Embodiment 2, and the dotted line represents the characteristics of the simple quantum well structure.

FIG. 15 illustrates the α parameter during the modulation from the point Z to the point Y in FIG. 2. In FIG. 15, the horizontal axis represents the push-pull voltage ΔV (V), and the vertical axis represents the α parameter. Furthermore, the solid line represents the characteristics of the structure according to Preferred Embodiment 2, and the dotted line represents the characteristics of the simple quantum well structure.

The horizontal axes in FIGS. 13 to 15 represent the push-pull voltage that is associated with the dependence on the reverse bias voltage. Thus, for example, FIG. 13 substantially illustrates the dependence of the refractive index change on the reverse bias voltage. Furthermore, the drawing obtained by horizontally flipping FIG. 15 illustrates the dependence of the α parameter on the reverse bias voltage during the modulation from the point X to the point Z in FIG. 2.

The results of FIGS. 13 to 15 will be described in detail. The result of FIG. 13 shows that the curve illustrating the dependence of the amount of phase shift on the reverse bias voltage in the structure according to Preferred Embodiment 2 is more linear than that of the simple quantum well structure. This supports one of the advantages described in Preferred Embodiment 1, that is, increasing the linearity.

The result of FIG. 14 shows that the structure according to Preferred Embodiment 2 has smaller absorption loss (amount of optical loss) than that of the simple quantum well structure. In other words, the absorption loss approximates to zero.

The result of FIG. 15 shows that when, in particular, the push-pull voltages are near Vπ, the α parameters in the structure according to Preferred Embodiment 2 approximate to zero slightly more than by the simple quantum well structure.

Figure 16:
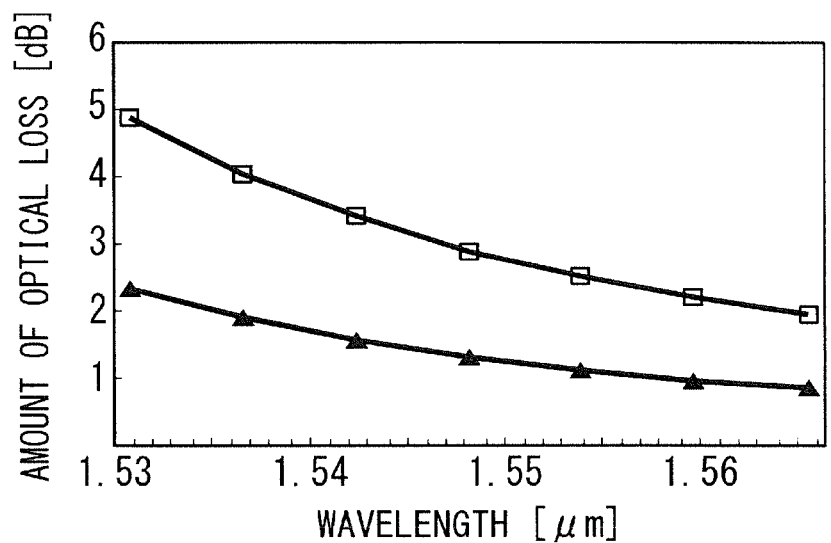
FIG. 16 illustrates a relationship between the amount of optical loss and the wavelength in the semiconductor optical modulator according to Preferred Embodiment 2.

FIG. 16 illustrates the results of optical loss in the structure according to Preferred Embodiment 2 and the simple quantum well structure, when the wavelength changes. In FIG. 16, the black triangles represent the result of optical loss in the structure according to Preferred Embodiment 2, and the white squares represent the result of optical loss in the simple quantum well structure. The result of FIG. 16 shows that the structure according to Preferred Embodiment 2 has smaller optical loss that that in the simple quantum well structure, not limited at particular wavelengths but over the C-band that is conventionally used in the optical communication.

Conclusion of Preferred Embodiment 2

In the power semiconductor device according to Preferred Embodiment 2, the multiple quantum well structure 11 includes a plurality of the layer structures 11s disposed in a connection direction of the first and second barrier layers 11a and 11d, the intermediate layer 11b, and the well layer 11c in the layer structure 11. In any adjacent two of the layer structures 11s, the second barrier layer 11d of one of the two layer structures 11s that is closer to the p-type clad layer 12 is used as the first barrier layer 11a of the other of the two layer structures 11s that is closer to the n-type clad layer 10.

With such a structure, the refractive index change caused by the electric field change with application of the reverse bias voltage can be approximated to be linear and the α parameters can be approximated to zero, as according to Preferred Embodiment 1. Furthermore, the optical loss can be reduced over the C band.

Figure 17:
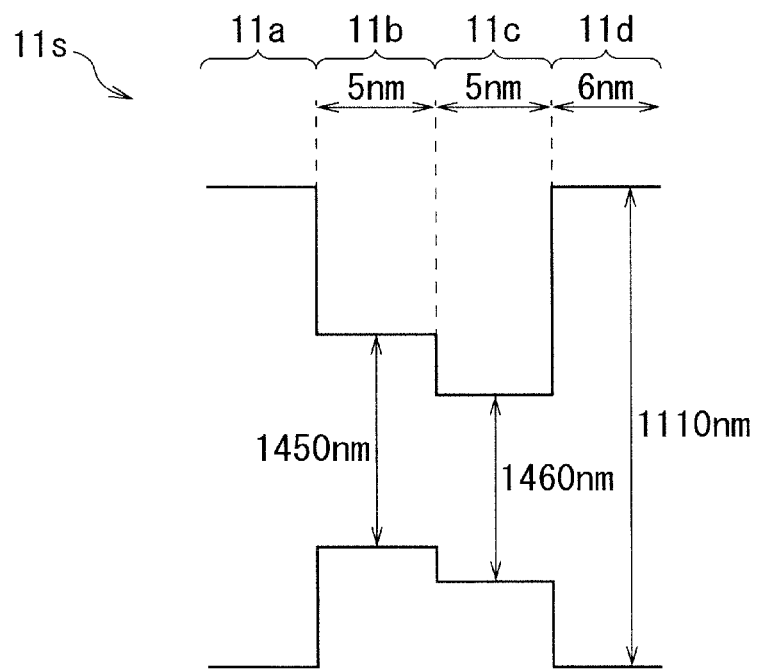
FIGS. 17 and 18 each illustrate a band diagram of a layer structure according to Preferred Embodiment 2.

A layer structure 11s having a band diagram as illustrated in FIG. 17 (the first barrier layer 11a, the intermediate layer 11b, the well layer 11c, and the second barrier layer 11d) may be used instead of the layer structure 11s in FIG. 12. In FIG. 17, the first and second barrier layers 11a and 11d are layers containing AlGaInAs and having a thickness of, for example, 6 nm. The intermediate layer 11b is a layer containing AlGaInAs and having a thickness of, for example, 5 nm. The well layer 11c is a layer containing GaInAsPSb and having a thickness of, for example, 5 nm. With such a structure, the refractive index change caused by the electric field change with application of the reverse bias voltage can be approximated to be linear, and the α parameter can be approximated to zero as described above. Furthermore, the optical loss can be reduced over the L band that is frequently used in the optical communication other than the C band.

Figure 18:
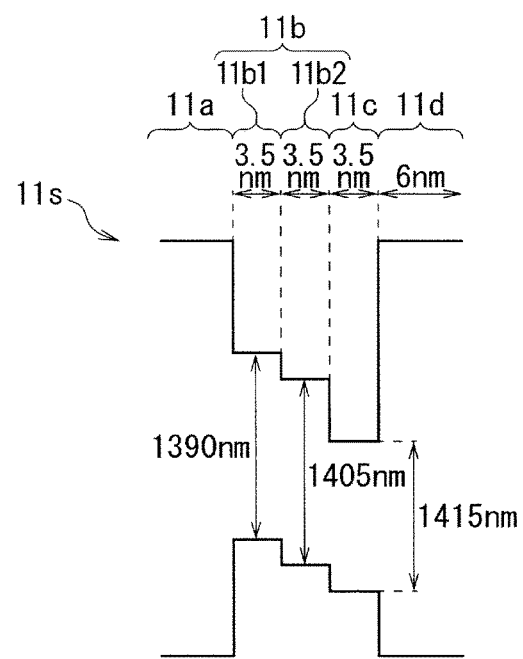

Furthermore, a layer structure 11s having a band diagram as illustrated in FIG. 18 may be used instead of the layer structures 11s in FIGS. 12 and 17. The intermediate layer 11b in the layer structure 11s includes a first intermediate layer 11b1 and a second intermediate layer 11b2.

The first intermediate layer 11b1 is connected to a portion of the first barrier layer 11a that is closer to the n-type clad layer 10. Furthermore, the first intermediate layer 11b1 has, as the second bandgap, a bandgap smaller than the first bandgap of the first barrier layer 11a and larger than the third bandgap of the well layer 11c.

The second intermediate layer 11b2 is connected to a portion of the first intermediate layer 11b1 that is closer to the n-type clad layer 10, and to a portion of the well layer 11c that is closer to the p-type clad layer 12. Furthermore, the second intermediate layer 11b2 has, as a fourth bandgap which is a different type of the second bandgap, a bandgap smaller than the bandgap of the first intermediate layer 11b1 and larger than the third bandgap of the well layer 11c.

Furthermore, the conduction band energy of the first and second barrier layers 11a and 11d is larger than a conduction band energy of the first intermediate layer 11b1, and the conduction band energy of the first intermediate layer 11b1 is larger than a conduction band energy of the second intermediate layer 11b2, and the conduction band energy of the second intermediate layer 11b2 is larger than the conduction band energy of the well layer 11c. A valence band energy of the first intermediate layer 11b1 is larger than a valence band energy of the second intermediate layer 11b2, and the valence band energy of the second intermediate layer 11b2 is larger than the valence band energy of the well layer 11c, and the valence band energy of the well layer 11c is larger than the valence band energy of the first and second barrier layers 11a and 11d.

In FIG. 18, the first and second barrier layers 11a and 11d are layers containing AlGaInAs and having a thickness of, for example, 6 nm. The first intermediate layer 11b1 is a layer containing AlGaInAs and having a thickness of, for example, 3.5 nm. The second intermediate layer 11b2 has a tensile strain, and is a layer containing AlGaInAs and having a thickness of, for example, 3.5 nm. The well layer 11c is a layer containing GaInAsPSb and having a thickness of, for example, 3.5 nm. With such a structure, the refractive index change caused by the electric field change with application of the reverse bias voltage can be approximated to be linear and the α parameter can be approximated to zero as described above.

Preferred Embodiment 3

Figure 19:
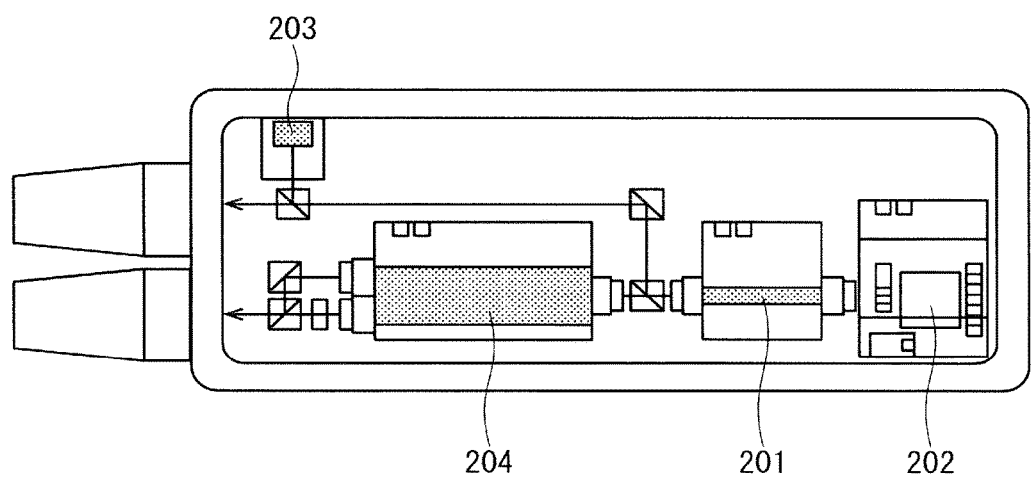
FIG. 19 is a plan view illustrating a configuration of an optical module according to Preferred Embodiment 3.

FIG. 19 is a plan view illustrating a configuration of an optical module according to Preferred Embodiment 3 of the present invention. The optical module of FIG. 19 includes a wavelength-tunable laser source 201, a wavelength-monitoring photodiode (PD) 202 including an etalon, a semiconductor optical modulator 204 that is the semiconductor optical modulator according to Preferred Embodiment 1 or 2, and a light-monitoring photodiode (PD) 203. In other words, the optical module of FIG. 19 includes the semiconductor optical modulator according to Preferred Embodiment 1 or 2. Here, feedback control is performed on the wavelength-tunable laser source 201, based on output from the wavelength-monitoring PD 202 (a result of measurement of the wavelength of output light) and output from the light-monitoring PD 203 (a result of measurement of the intensity of the output light). Accordingly, light oscillating at a desired wavelength is output from the wavelength-tunable laser source 201. Changing the DC bias voltage in the semiconductor optical modulator 204 that is an MZ modulator under this control enables the optical module to be adjusted to operate at a particular RF voltage amplitude.

Within the scope of the present invention, Embodiments can be freely combined, and each of Embodiments can be appropriately modified or omitted.

While the invention has been shown and described in detail, the foregoing description is in all aspects illustrative and not restrictive. It is therefore understood that numerous modifications and variations can be devised without departing from the scope of the invention.

What is claimed is:

1. A semiconductor optical modulator comprising:
a semiconductor substrate; and
a semiconductor multilayer structure formed on said semiconductor substrate and included in an optical waveguide in which a phase of light shifts with application of a voltage,
said semiconductor multilayer structure including:
a p-type clad layer and an n-type clad layer; and
a multiple quantum well structure sandwiched between said p-type clad layer and said n-type clad layer,
said multiple quantum well structure including a layer structure including:
a first barrier layer having a first bandgap;
an intermediate layer connected to a portion of said first barrier layer and having a second bandgap smaller than said first bandgap, the portion being closer to said n-type clad layer;
a well layer connected to a portion of said intermediate layer and having a third bandgap smaller than said second bandgap, the portion being closer to said n-type clad layer; and
a second barrier layer connected to a portion of said well layer and having said first bandgap, the portion being closer to said n-type clad layer, wherein
a conduction band energy of said first and second barrier layers is larger than a conduction band energy of said intermediate layer, and the conduction band energy of said intermediate layer is larger than a conduction band energy of said well layer,
a valence band energy of said intermediate layer is larger than a valence band energy of said well layer, and the valence band energy of said well layer is larger than a valence band energy of said first and second barrier layers, and
a conduction band energy difference between the intermediate layer and the well layer is larger than a valence band energy difference between the intermediate layer and the well layer such that, even when a voltage is not applied to the optical waveguide, an electric field applied to the conduction band is larger than an electric field applied to the valence band.

2. The semiconductor optical modulator according to claim 1,
wherein said multiple quantum well structure includes a plurality of said layer structures disposed in a connection direction of said first and second barrier layers, said intermediate layer, and said well layer in said layer structure, and
in any adjacent two of said layer structures, said second barrier layer of one of said two layer structures that is closer to said p-type clad layer is used as said first barrier layer of the other of said two layer structures that is closer to said n-type clad layer.

3. The semiconductor optical modulator according to claim 1,
wherein said first and second barrier layers contain AlGaInAs, said intermediate layer contains AlGaInAs, and said well layer contains InGaAsP or GaInAsPSb.

4. The semiconductor optical modulator according to claim 1,
wherein said intermediate layer includes:
a first intermediate layer which is connected to the portion of said first barrier layer that is closer to said n-type clad layer, and which has, as said second bandgap, a bandgap smaller than said first bandgap and larger than said third bandgap; and
a second intermediate layer which is connected to a portion of said first intermediate layer that is closer to said n-type clad layer and to a portion of said well layer that is closer to said p-type clad layer, and which has, as a fourth bandgap, a bandgap smaller than the bandgap of said first intermediate layer and larger than said third bandgap,
wherein the conduction band energy of said first and second barrier layers is larger than a conduction band energy of said first intermediate layer, and the conduction band energy of said first intermediate layer is larger than a conduction band energy of said second intermediate layer, and the conduction band energy of said second intermediate layer is larger than the conduction band energy of said well layer, and
a valence band energy of said first intermediate layer is larger than a valence band energy of said second intermediate layer, and the valence band energy of said second intermediate layer is larger than the valence band energy of said well layer, and the valence band energy of said well layer is larger than the valence band energy of said first and second barrier layers.

5. An optical module comprising said semiconductor optical modulator according to claim 1.

* * * * *